(12) United States Patent
Lee

(10) Patent No.: US 9,209,429 B2
(45) Date of Patent: Dec. 8, 2015

(54) BATTERY PACK

(71) Applicant: Samsung SDI Co., Ltd., Yongin-si, Gyeonggi-do (KR)

(72) Inventor: Won-Il Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 164 days.

(21) Appl. No.: 14/011,309

(22) Filed: Aug. 27, 2013

(65) Prior Publication Data

US 2014/0220389 A1    Aug. 7, 2014

(30) Foreign Application Priority Data

Feb. 5, 2013    (KR) .................... 10-2013-0012937

(51) Int. Cl.
| | |
|---|---|
| *H01M 2/10* | (2006.01) |
| *H01M 2/02* | (2006.01) |
| *H01M 10/42* | (2006.01) |
| *H01M 10/48* | (2006.01) |
| *H01M 2/34* | (2006.01) |

(52) U.S. Cl.
CPC .......... *H01M 2/0212* (2013.01); *H01M 2/1061* (2013.01); *H01M 10/425* (2013.01); *H01M 2/1022* (2013.01); *H01M 2/348* (2013.01); *H01M 10/486* (2013.01)

(58) Field of Classification Search
CPC . H01M 2/348; H01M 2/1061; H01M 10/486; H01M 10/425; H01M 2200/10
USPC ............................................................ 429/7
See application file for complete search history.

(56) References Cited

U.S. PATENT DOCUMENTS

| | | | | |
|---|---|---|---|---|
| 2011/0039132 A1* | 2/2011 | Do | ................................. | 429/7 |
| 2012/0015226 A1* | 1/2012 | Kim et al. | ...................... | 429/94 |
| 2012/0088135 A1* | 4/2012 | Kim et al. | ...................... | 429/90 |
| 2013/0149561 A1* | 6/2013 | Hong et al. | ....................... | 429/7 |
| 2014/0065448 A1* | 3/2014 | Ahn et al. | ................................. | 429/7 |
| 2014/0147705 A1* | 5/2014 | Wang et al. | ....................... | 429/7 |
| 2014/0193670 A1* | 7/2014 | Ahn | ................................. | 429/7 |
| 2014/0220387 A1* | 8/2014 | Lee | ................................. | 429/7 |

FOREIGN PATENT DOCUMENTS

| | | |
|---|---|---|
| JP | 2004-327340 A | 11/2004 |
| JP | 2004-356027 A | 12/2004 |
| KR | 10-1089168 B1 | 11/2011 |

\* cited by examiner

*Primary Examiner* — Stewart Fraser
(74) *Attorney, Agent, or Firm* — Knobbe, Martens, Olson & Bear, LLP

(57) ABSTRACT

A battery pack is disclosed. In one aspect the battery pack includes a battery cell including an electrode assembly and a pouch that seals the electrode assembly and a frame that accommodates the battery cell, wherein the frame comprises i) a main frame that surrounds the battery cell and ii) a rib that crosses the main frame. The pouch includes i) a pair of side-wing units each having a shape substantially similar to a side surface of the battery cell and extending in a direction and ii) a terrace unit connected to the side-wing units. Each of the side-wing units includes an extension unit that extends on the terrace unit along the direction. The frame includes an insertion unit into which the extension unit is inserted, and the rib is located on the terrace unit. According to embodiments, the capacity of the battery pack increases.

20 Claims, 4 Drawing Sheets

BATTERY PACK

RELATED APPLICATIONS

This application claims the benefit of Korean Patent Application No. 10-2013-0012937, filed on Feb. 5, 2013, in the Korean Intellectual Property Office, the disclosure of which is incorporated herein in its entirety by reference.

BACKGROUND

1. Field

The described technology generally relates to battery packs, and more particularly, to battery packs having an increased capacity.

2. Description of the Related Technology

As the strong development of internet or wireless communication techniques, the use of portable computers, such as tablet personal computers and notebooks, which operate by using a battery has been considerably increased. Generally, portable computers are widely used for business or personal purposes due to their high mobility since they are small in size and easy to carry around.

To freely use portable computers in various places irrespective of a power supply device, a built-in battery pack may be included therein. The battery pack may include a secondary battery that may be repeatedly charged and discharged.

However, in this case, since the portable computers are operated by a power source stored in a battery pack, the operating hours and use of the portable computer are limited by the capacity of the battery pack.

SUMMARY

One inventive aspect, is battery packs having an increased capacity.

Another aspect is a battery pack including: a battery cell having an electrode assembly and a pouch that seals the electrode assembly; and a frame that accommodates the battery cell and includes a main frame that forms an outer-line unit, a rib that crosses the main frame, wherein the pouch includes a side-wing unit pair, and a terrace unit formed by fusion welding, the side-wing unit pair includes an extension unit that is bent to be parallel to a side surface of the battery cell and extends on the terrace unit, the frame includes an insertion unit into which the extension unit is inserted, and the rib is located on the terrace unit.

The insertion unit may be formed by bending the rib.

The insertion unit may be formed at a location where the rib contacts the main frame.

The rib may be bent in a length direction of the extension unit.

The rib may be bent to contact a side surface of the battery cell.

The frame may have a quadrangular shape and the rib may include first and second ribs separated from each other, wherein the first and second ribs are formed parallel to a short side of the main frame across the main frame.

The battery cell may include a first battery cell and a second battery cell, wherein the first battery cell is accommodated in the main frame and the first rib and the second battery cell is accommodated in the main frame and the second rib.

The battery pack may further include a protection circuit module (PCM) that is disposed between the first and second ribs and is electrically connected to the first battery cell and the second battery cell.

The PCM is connected to a thermal sensor that measures a temperature of the first battery cell and the second battery cell.

The extension unit may have a slope in the length direction thereof.

Another aspect is a battery pack including: a main frame; first and second ribs that cross the main frame and are separated from each other; a first battery cell that is accommodated in the main frame and the first rib; and a second battery cell that is accommodated in the main frame and the second rib, wherein the first battery cell and the second battery cell respectively include an electrode assembly and a pouch that surrounds the electrode assembly, the pouch includes a side-wing unit pair and a terrace unit which are formed by fusion welding, the side-wing unit pair including an extension unit that is bent perpendicularly to the terrace unit and extends on the terrace unit, and each of the first and second ribs including an insertion unit into which the extension unit is inserted.

The first rib may be located on the terrace unit of the first battery cell and the second rib may be located on the terrace unit of the second battery cell.

The first and second ribs respectively may be bent to form the insertion unit.

The insertion unit may be formed on a region where each of the first and second ribs contacts the main frame.

The first and second ribs may be bent in a length direction of the extension unit.

The first rib may be bent to contact a side surface of the first battery cell and the second rib may be bent to contact a side surface of the second battery cell.

The extension unit may be formed to have a slope in the length direction thereof.

The battery pack may further include a PCM disposed between the first and second ribs, wherein the PCM is electrically connected to the first battery cell and the second battery cell.

The PCM may be simultaneously located on the terrace unit of the first battery cell and the terrace unit of the second battery cell.

The main frame and the first and second ribs may be formed as one body.

The main frame may have a quadrangular shape, and the first and second ribs may be formed parallel to a short side of the main frame.

Another aspect is a battery pack comprising: a battery cell including an electrode assembly and a pouch that seals the electrode assembly; and a frame that accommodates the battery cell, wherein the frame comprises i) a main frame that surrounds the battery cell and ii) a rib that crosses the main frame, wherein the pouch comprises i) a pair of side-wing units each having a shape substantially similar to a side surface of the battery cell and extending in a particular direction and ii) a terrace unit connected to the side-wing units, wherein each of the side-wing units comprises an extension unit that extends on the terrace unit along the particular direction, wherein the frame comprises an insertion unit into which the extension unit is inserted, and wherein the rib is located on the terrace unit.

In the above battery pack, the rib comprises a bent portion that forms the insertion unit. In the above battery pack, the insertion unit is formed at a location where the rib contacts the main frame. In the above battery pack, the rib comprises a bent portion which is bent along the particular direction. In the above battery pack, the battery cell is not disposed between the extension units. In the above battery pack, the frame has a substantially quadrangular shape, wherein the rib comprises first and second ribs separated from each other, and wherein the first and second ribs are formed substantially parallel to a short side of the main frame to cross the main frame.

In the above battery pack, the battery cell comprises i) a first battery cell accommodated in the main frame and the first rib and ii) a second battery cell accommodated in the main frame and the second rib. The above battery pack further comprises a protection circuit module (PCM) that is disposed between the first and second ribs and is electrically connected to the first and second battery cells. In the above battery pack, the PCM is connected to a thermal sensor configured to measure a temperature of the first and second battery cells. In the above battery pack, each of the side-wing units has top and bottom portions opposing each other, and wherein the extension unit is slanted with respect to at least one of the top and bottom portions. In the above battery pack, the side-wing units and the terrace unit are fusion welded to each other.

Another aspect is a battery pack comprising: a main frame; first and second ribs that cross the main frame and are separated from each other; a first battery cell that is accommodated in the main frame and the first rib; and a second battery cell that is accommodated in the main frame and the second rib, wherein each of the first and second battery cells comprises an electrode assembly and a pouch that surrounds the electrode assembly, wherein the pouch comprises a pair of side-wing units and a terrace unit connected to the side-wing units, wherein each of the side-wing units comprises an extension unit that extends on the terrace unit to be substantially perpendicular to the terrace unit, and wherein each of the first and second ribs comprises an insertion unit into which the extension unit is inserted.

In the above battery pack, the first rib is located on the terrace unit of the first battery cell and wherein the second rib is located on the terrace unit of the second battery cell. In the above battery pack, each of the first and second ribs comprises a bent portion that is bent in a length direction of the extension unit. In the above battery pack, the bent portion of the first rib contacts a side surface of the first battery cell and wherein the bent portion of the second rib contacts a side surface of the second battery cell. In the above battery pack, each of the side-wing units has top and bottom portions opposing each other, and wherein the extension unit is slanted with respect to at least one of the top and bottom portions. The above battery pack further comprises a protective circuit module (PCM) located on the terrace unit of the first battery cell and the terrace unit of the second battery cell. In the above battery pack, the main frame and the first and second ribs are formed as a single body.

Another aspect is battery pack comprising: a main frame; first and second ribs that cross the main frame and are separated from each other; a first battery cell that is accommodated in the main frame and the first rib; and a second battery cell that is accommodated in the main frame and the second rib, wherein each of the first and second battery cells comprises an electrode assembly extending in a particular direction and a pouch that surrounds the electrode assembly, wherein the pouch comprises first and second extensions each extending from a side surface of the pouch along the particular direction not to contact the electrode assembly, and wherein the first and second ribs respectively comprise first and second grooves configured to receive the first and second extensions, respectively.

In the above battery pack, each of the extensions has a downward slope formed along the particular direction.

DETAILED DESCRIPTION

Figure 1:
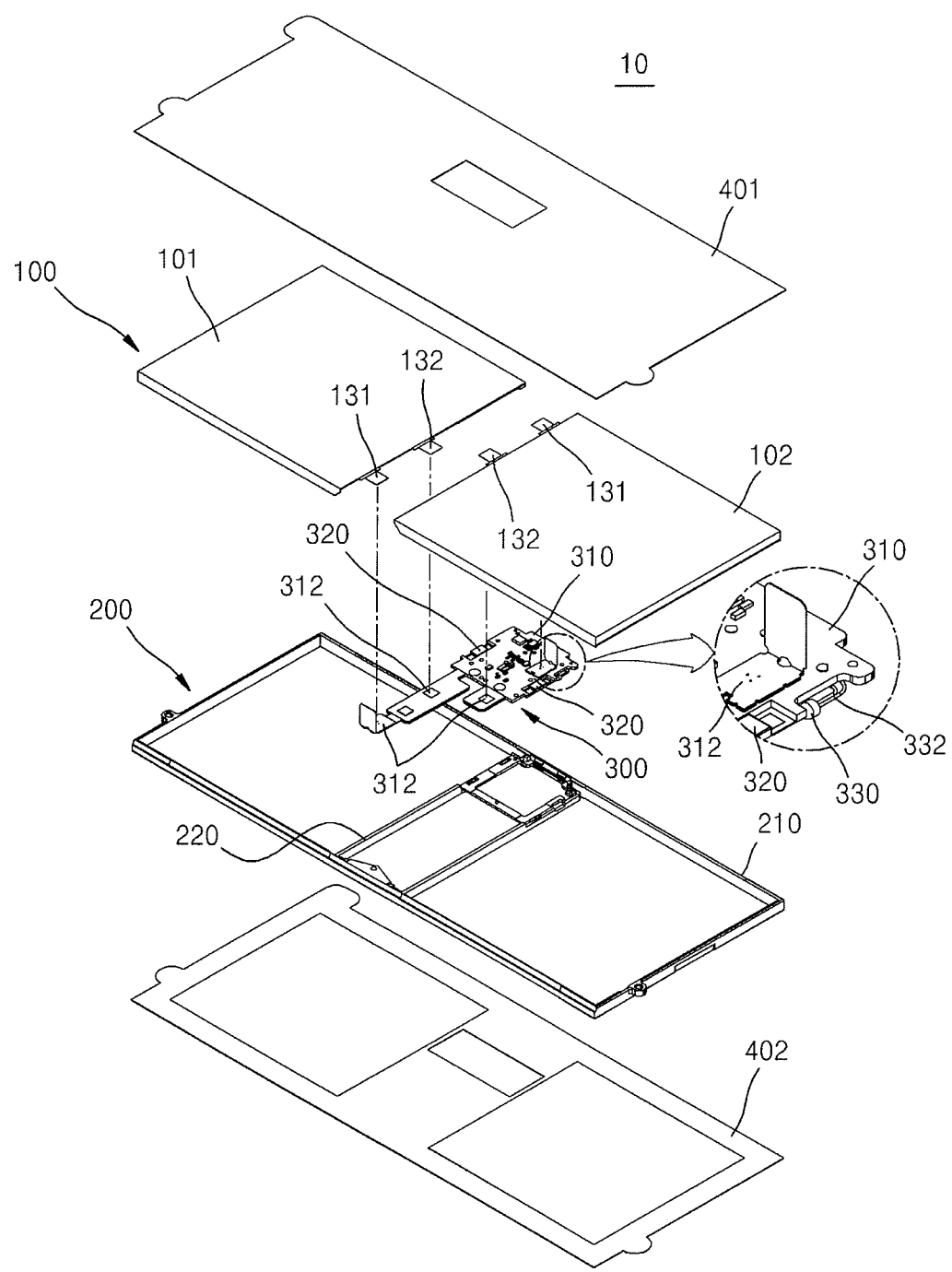
FIG. 1 is a schematic exploded perspective view of a battery pack according to an embodiment.

While exemplary embodiments are capable of various modifications and alternative forms, embodiments thereof are shown by way of example in the drawings and will herein be described in detail. It should be understood, however, that there is no intent to limit exemplary embodiments to the particular forms disclosed, but on the contrary, exemplary embodiments are to cover all modifications, equivalents, and alternatives falling within the scope of the invention.

It will be understood that, although the terms 'first', 'second', etc. may be used herein to describe various elements, these elements should not be limited by these terms. These terms are only used to distinguish one element from another.

The terminologies used herein are for the purpose of describing embodiments only and are not intended to be limiting of exemplary embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Hereafter, embodiments will be described more fully with reference to the accompanying drawings.

Figure 2:
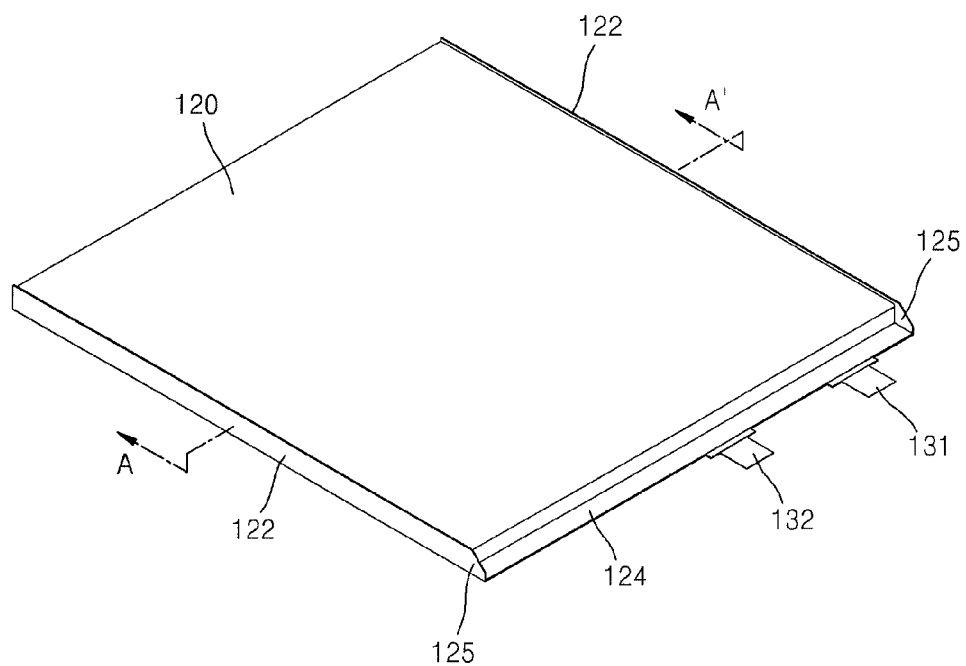
FIG. 2 is a perspective view of a battery cell of the battery pack of FIG. 1.
Figure 3:
FIG. 3 is a cross-sectional view taken along line A-A' of FIG. 2.

FIG. 1 is a schematic exploded perspective view of a battery pack 10 according to an embodiment. FIG. 2 is a perspective view of a battery cell 100 of the battery pack 10 of FIG. 1. FIG. 3 is a cross-sectional view taken along line A-A' of FIG. 2.

Referring to FIGS. 1 through 3, the battery pack 10 according to the current embodiment may include the battery cell 100, a frame 200 that accommodates the battery cell 100, and a protection circuit module (PCM) 300 that is electrically connected to the battery cell 100.

As depicted in FIGS. 2 and 3, the battery cell 100 may include an electrode assembly 110 and a pouch 120 that seals the electrode assembly 110.

The electrode assembly 110 may be manufactured, for example, in a jelly roll type by winding a stack of an anode plate on which an anode active material is coated, a cathode plate on which a cathode active material is coated, and a separator interposed between the anode and cathode plates. Alternatively, the electrode assembly 110 may be manufactured by repeatedly stacking an anode plate, a separator, and a cathode plate in the stated order.

The pouch 120 seals the electrode assembly 110 and may include a side-wing unit pair 122 and a terrace unit 124, which are formed by fusion welding.

In some embodiments, when the electrode assembly 110 is accommodated in an accommodating unit (not shown) including an accommodating space for accommodating the electrode assembly 110, a cover unit (not shown), a side of which is continuously formed with the accommodating unit, is folded on the accommodating unit, and afterwards, the accommodating unit and the cover unit are connected to each other, for example, via fusion welding, at an edge of the accommodating space. As a result, the electrode assembly 110 may be sealed, and the edge where the accommodating unit and the cover unit are fusion welded forms the side-wing unit pair 122 and the terrace unit 124.

The side-wing unit pair 122 may have a shape substantially similar to a side surface of the battery cell 100. Alternately, the side-wing unit pair 122 may be bent to contact the side surface of the battery cell 100. The bent side-wing unit pair 122 may extend to the terrace unit 124, and the side-wing unit pair 122 may include an extension unit (or an extension) 125 that is bent on the terrace unit 124.

The extension unit 125 may bend substantially perpendicular to the terrace unit 124 on the terrace unit 124. As a result, the side-wing unit pair 122 that is consecutively formed with the extension unit 125 may bend substantially perpendicular to the terrace unit 124. Also, the extension unit 125 may be formed to have a slope along a length direction of the extension unit 125.

A first electrode tap 131 and a second electrode tap 132 are attached to the electrode assembly 110. The first and second electrode taps 131 and 132 are electrically connected to the PCM 300 by protruding to the outside through the terrace unit 124.

The battery cell 100 described above may have an outer-line unit having a quadrangular shape and at least one battery cell 100 may be included in the battery pack 10. In FIG. 1, the battery cell 100 includes a first battery cell 101 and a second battery cell 102, but the current embodiment is not limited thereto.

As depicted in FIG. 1, when the first battery cell 101 and the second battery cell 102 are included in the battery pack 10, the first and second battery cells 101 and 102 may be disposed so that the electrode taps 121 and 122 respectively included in the battery cells 101 and 102 face each other, and the PCM 300 may be disposed between the two battery cells 101 and 102.

The frame 200 may include a main frame 210 that forms an outer-line unit of the frame 200 and at least one rib 220 that crosses the main frame 210 to accommodate the battery cell 100 and the PCM 300.

For example, as depicted in FIG. 1, when the battery pack 10 includes the first battery cell 101 and the second battery cell 102, in order to define two accommodating regions for respectively accommodating the two battery cells 101 and 102, the frame 200 may include two ribs 220. In another embodiment, the battery pack includes more than two battery cells and the frame has a corresponding shape accommodating the battery cells.

The frame 200 may be formed of an insulating material, for example, a thermo plastic polymer resin. Also, the frame 200 may be formed of a material having elasticity to mitigate an impact on the battery pack 10 such as when the battery pack 10 falls down.

The frame 200 includes an insertion unit (or a groove) 224 (refer to FIG. 4) into which the extension unit 125 is inserted. Therefore, an assembly of the battery pack 10 may be simplified, and the capacity of the battery pack 10 may be increased by increasing the size of the battery cell 100. This will be described in detail with reference to FIGS. 4 and 5.

The PCM 300 is electrically connected to the battery cell 100. For example, as depicted in FIG. 1, when the battery pack 10 includes the first battery cell 101 and the second battery cell 102, the PCM 300 is located between the two ribs 220 formed on the frame 200, and thus, is electrically connected to the first and second battery cells 101 and 102.

According to the current embodiment, the PCM 300 may be electrically connected to the battery cells 101 and 102 by respectively welding the first and second electrode taps 131 and 132 respectively included in the battery cells 101 and 102 to connection units 312 of the PCM 300.

Although not shown, when the PCM 300 is located between the two ribs 220, covers (not shown) for covering an upper surface and a lower surface of the PCM 300 may be combined with the two ribs 220.

The PCM 300 includes a thermal protection device 320 mounted on the substrate 310. Accordingly, overheating and explosion due to overcharging, over-discharging, or an over current flow of the first battery cell 101 and the second battery cell 102 may be prevented. The thermal protection device 320 is a device in which electrification and insulation are reversibly performed according to temperature, and thus, may prevent the battery pack 10 from causing ignition or explosion due to an over current. The thermal protection device 320 may be, for example, a polymeric positive temperature coefficient (PTC) device in which conductive particles such as metal particles or carbon particles are distributed in a crystalline polymer, but is not limited thereto.

A thermal sensor 330 may be attached to the PCM 300. The thermal sensor 330 generates an electrical signal corresponding to temperature information at a temperature measuring point and transmits the electrical signal to the PCM 300. For example, the thermal sensor 330 may be a thermistor. More specifically, the thermistor generates an electrical signal corresponding to a temperature of a temperature measuring object, and thus, may be a resistance-type thermistor of which electrical resistance varies with the temperature.

The thermal sensor 330 may be disposed substantially parallel to a length direction of the PCM 300. The thermal sensor 330 may be disposed adjacent to at least one of both sides of the PCM 300. In FIG. 1, the thermal sensor 330 is disposed on a right side of the PCM 300.

The thermal sensor 330 described above may monitor a temperature change of the battery cell 100, and the PCM 300 may control charging and discharging of the battery cell 100 in response to a monitoring result of the thermal sensor 330. At this point, an electrical signal generated from the thermal sensor 330 may be transmitted to the PCM 300 via a cable 332 that connects the thermal sensor 330 to the PCM 300.

When the battery cell 100 and the PCM 300 are located in the frame 200, an upper surface 401 and a lower surface may be attached to the frame 200.

Figure 4:
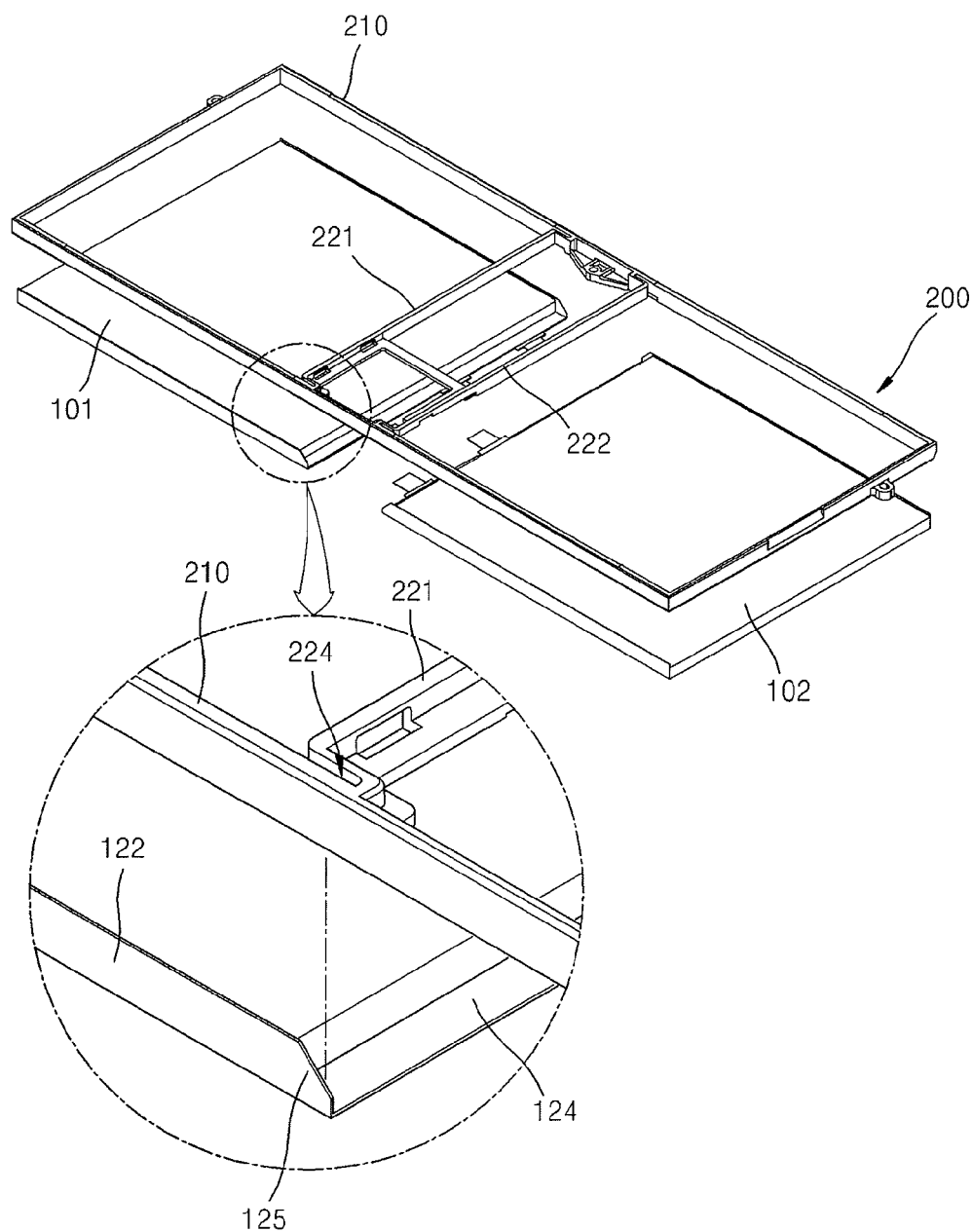
FIG. 4 is an exploded perspective view of a frame and a battery cell of the battery pack of FIG. 1.

FIG. 4 is an exploded perspective view of the frame 200 and the battery cell 100 of the battery pack 10 of FIG. 1. FIG. 1 shows a combination of the first battery cell 101 and the second battery cell 102 with the frame 200. In FIG. 4, the rib 200 includes first and second ribs 221 and 222 to define two accommodating regions for respectively accommodating the first battery cell 101 and the second battery cell 102, but the present invention is not limited thereto. For example, if the battery pack 10 according to the current embodiment includes only the first battery cell 101, in order to define an accommodating region for the first battery cell 101, only the first rib 221 depicted in FIG. 4 may be formed. At this point, the frame 200 for defining an accommodating region for accommodating the second battery cell 102 together with the second rib 222 may be reduced to a location for forming the second rib 222 is formed.

Referring to FIG. 4, the frame 200 may include the main frame 210 that forms an outer-line unit and the first and second ribs 221 and 222 that cross the main frame 210. The main frame 210 and the first and second ribs 221 and 222 may be formed as one-body by injection molding. In some embodiments, the ribs 221 and 222 are substantially perpendicular to the main frame 210. In another embodiment, the ribs 221 and 222 are not perpendicular to the main frame 210, as long as the ribs 221 and 222 intersect with the main frame 210.

The main frame 210 and the first and second ribs 221 and 222 may be formed according to the outer-line unit of the first and second battery cells 101 and 102 to be accommodated.

For example, when each of the first and second battery cells 101 and 102 has a quadrangular shape, the main frame 210 may have a rectangular shape, and the first and second ribs 221 and 222 are separated from each other and may be formed substantially parallel to a short side of the main frame 210. Accordingly, the first rib 221 may form a region for accommodating the first battery cell 101 together with the main frame 210, and also, the second rib 222 may form a region for accommodating the second battery cell 102 together with the main frame 210 apart from the region for accommodating the first battery cell 101.

As depicted in FIG. 4, the insertion unit 224 is formed at a location where the first and second ribs 221 and 222 contact the main frame 210. That is, the insertion unit 224 is formed to correspond to the location of the extension unit 125 so that the extension unit 125 is formed substantially perpendicular to the terrace unit 124. In FIG. 4, since the first battery cell 101 and the second battery cell 102 respectively include two extension units 125, there are four insertion units 224 on the frame 200.

In this way, when the insertion unit 224 into which the extension unit 125 is inserted is formed on the frame 200, the combining position of the first and second battery cells 101 and 201 may be readily set when the battery cells 101 and 102 are combined with the frame 200, and thus, the manufacture of the battery pack 10 (refer to FIG. 1) is simplified. Also, since the extension unit 125 is formed to have a slope along a length direction of the extension unit 125, the insertion of the extension unit 125 into the insertion unit 224 is also easy.

For convenience of explanation, FIG. 4 also shows a magnified image of a structure of the insertion unit 224 formed on a side of the first rib 221 that contacts the main frame 210.

In one embodiment, as shown in the magnified portion in FIG. 4, the insertion unit 224 is formed by bending the first rib 221. For example, the first rib 221 is bent in a direction of the extension unit 125 of the first battery cell 101 to form the insertion unit 224.

Also, since the insertion unit 224 is substantially identically formed on the other side of the first rib 221 that contacts the main frame 210, the first rib 221 is bent to contact on a side surface of the first battery cell 101, and as a result, the first rib 221 is located on the terrace unit 124 of the first battery cell 101.

In the same manner, the second rib 222 is also bent in the length direction of the extension unit 125 of the second battery cell 102, and as a result, the second rib 222 is located on the terrace unit 124 of the second battery cell 102.

In this way, since the first and second ribs 221 and 222 are respectively located on the first and second battery cells 101 and 102, the sizes of the battery cells 101 and 102 may be increased, which will be described below with reference to FIG. 5.

Figure 5:
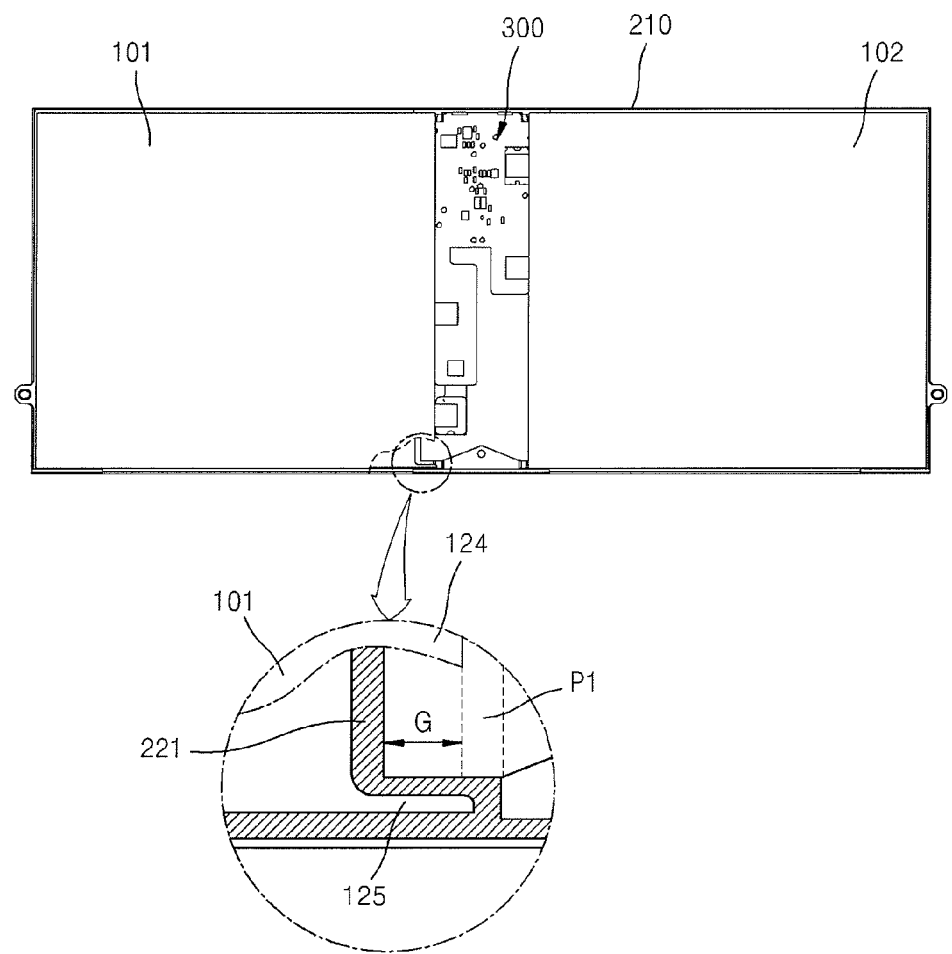
FIG. 5 is a plan view of a battery cell and a protection circuit module (PCM) that are assembled in the frame of the battery pack of FIG. 1.

FIG. 5 is a plan view of a battery cell and a PCM that are assembled in the frame of the battery pack of FIG. 1. As in FIG. 4, FIG. 5 shows the first and second battery cells 101 and 102 and the first and second ribs 221 and 222.

Referring to both FIGS. 4 and 5, after disposing the PCM 300 between the first and second ribs 221 and 222, the first and second battery cells 101 and 102 may be combined in regions defined by the main frame 210 and the first and second ribs 221 and 222.

As described above, each of the first and second ribs 221 and 222 is bent to form the insertion unit 224, and the first and second ribs 221 and 222 are respectively located on the terrace unit 124 of the battery cells 101 and 102.

If the first rib 221 is not bent, the first rib 221 that is formed to cross the main frame 210 is needed to include the extension unit 125 of the first battery cell 101. That is, if the first rib 221 is not bent, since the first rib 221 is located on an imaginary line P1 indicated by a dotted line in FIG. 5, an area of a region formed by the first rib 221 and the main frame 210 to accommodate the first battery cell 101 is increased.

In the same manner, if the second rib 222 is not bent, an area of a region formed by the second rib 222 and the main frame 210 to accommodate the second battery cell 102 is increased.

However, as shown in the current embodiment, since the first and second ribs 221 and 222 are bent and are respectively located on the terrace units 124 of the first and second battery cells 101 and 102, an area between the first and second ribs 221 and 222 is increased.

Since the size of the PCM 300 disposed between the first and second ribs 221 and 222 is constant, the relative sizes of the battery cells 101 and 102 may increase.

For example, while an overall size of the battery pack 10 (refer to FIG. 1) is maintained substantially constant, the sizes of the first and second battery cells 101 and 102 included in the battery pack 10 may increase, and accordingly, the capacity of the battery pack 10 may also increase.

In some embodiments, the battery pack 10 includes the insertion units 224 into which the extension units 125 of the first and second ribs 221 and 222 are inserted. Therefore, when the first and second battery cells 101 and 102 are combined with the frame 200 (refer to FIG. 4), the combining position of the first and second battery cells 101 and 102 may be readily set, and accordingly, the manufacture of the battery pack 10 (refer to FIG. 1) may be simplified.

In some embodiments, the PCM 300 that is located between the first and second ribs 221 and 222 is located on the terrace unit 124 of both of the first and second battery cells 101 and 102. Accordingly, the thermal sensor 330 (refer to FIG. 1) connected to the PCM 300 is disposed further close to the first and second battery cells 101 and 102, a temperature variation of the first and second battery cells 101 and 102 may be immediately sensed by the thermal sensor 330. Accordingly, the reliability of the thermal sensor 330 is enhanced, and thus, the stability of the battery pack 10 (refer to FIG. 1) may also improve.

As shown in FIG. 5, the first and second ribs 221 and 222 are formed to cross the main frame 210 to accommodate the first and second battery cells 101 and 102, but the present invention is not limited thereto. That is, the first and second ribs 221 and 222 may perform as the main frame 210 and the battery pack 10 (refer to FIG. 1) may include only a single battery cell. Also, the battery pack 10 (refer to FIG. 1) may include three battery cells or more.

According to at least one of the disclosed embodiments, the rib may be formed on the terrace unit of a battery cell, and thus, the size of the battery cell may be increased, thereby increasing the capacity of the battery pack. Also, since the extension unit of the side-wing unit pair of the battery cell is inserted into the frame, the manufacture of the battery pack is simplified.

While the above embodiments have been described with reference to the accompanying drawings, it will be understood by those of ordinary skill in the art that various changes in form and details may be made therein without departing from the spirit and scope of the invention as defined by the appended claims. The embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A battery pack comprising:
a battery cell including an electrode assembly and a pouch that seals the electrode assembly; and
a frame that accommodates the battery cell, wherein the frame comprises i) a main frame that surrounds the battery cell and ii) a rib that crosses the main frame,
wherein the pouch comprises i) a pair of side-wing units each having a shape substantially similar to a side surface of the battery cell and extending in a particular direction and ii) a terrace unit connected to the side-wing units, wherein each of the side-wing units comprises an extension unit that extends on the terrace unit along the particular direction, wherein the frame comprises an insertion unit into which the extension unit is inserted, and wherein the rib is located on the terrace unit.

2. The battery pack of claim 1, wherein the rib comprises a bent portion that forms the insertion unit.

3. The battery pack of claim 2, wherein the insertion unit is formed at a location where the rib contacts the main frame.

4. The battery pack of claim 2, wherein the rib comprises a bent portion which is bent along the particular direction.

5. The battery pack of claim 4, wherein the battery cell is not disposed between the extension units.

6. The battery pack of claim 1, wherein the frame has a substantially quadrangular shape, wherein the rib comprises first and second ribs separated from each other, and
wherein the first and second ribs are formed substantially parallel to a short side of the main frame to cross the main frame.

7. The battery pack of claim 1, wherein the battery cell comprises i) a first battery cell accommodated in the main frame and the first rib and ii) a second battery cell accommodated in the main frame and the second rib.

8. The battery pack of claim 7, further comprising a protection circuit module (PCM) that is disposed between the first and second ribs and is electrically connected to the first and second battery cells.

9. The battery pack of claim 8, wherein the PCM is connected to a thermal sensor configured to measure a temperature of the first and second battery cells.

10. The battery pack of claim 1, wherein each of the side-wing units has top and bottom portions opposing each other, and wherein the extension unit is slanted with respect to at least one of the top and bottom portions.

11. The battery pack of claim 1, wherein the side-wing units and the terrace unit are fusion welded to each other.

12. A battery pack comprising:
a main frame;
first and second ribs that cross the main frame and are separated from each other;
a first battery cell that is accommodated in the main frame and the first rib; and
a second battery cell that is accommodated in the main frame and the second rib,
wherein each of the first and second battery cells comprises an electrode assembly and a pouch that surrounds the electrode assembly,
wherein the pouch comprises a pair of side-wing units and a terrace unit connected to the side-wing units, wherein each of the side-wing units comprises an extension unit that extends on the terrace unit to be substantially perpendicular to the terrace unit, and
wherein each of the first and second ribs comprises an insertion unit into which the extension unit is inserted.

13. The battery pack of claim 12, wherein the first rib is located on the terrace unit of the first battery cell and wherein the second rib is located on the terrace unit of the second battery cell.

14. The battery pack of claim 12, wherein each of the first and second ribs comprises a bent portion that is bent in a length direction of the extension unit.

15. The battery pack of claim 14, wherein the bent portion of the first rib contacts a side surface of the first battery cell and wherein the bent portion of the second rib contacts a side surface of the second battery cell.

16. The battery pack of claim 12, wherein each of the side-wing units has top and bottom portions opposing each other, and wherein the extension unit is slanted with respect to at least one of the top and bottom portions.

17. The battery pack of claim 12, further comprising a protective circuit module (PCM) located on the terrace unit of the first battery cell and the terrace unit of the second battery cell.

18. The battery pack of claim 12, wherein the main frame and the first and second ribs are formed as a single body.

19. A battery pack comprising:
a main frame;
first and second ribs that cross the main frame and are separated from each other;
a first battery cell that is accommodated in the main frame and the first rib; and
a second battery cell that is accommodated in the main frame and the second rib,
wherein each of the first and second battery cells comprises an electrode assembly extending in a particular direction and a pouch that surrounds the electrode assembly,
wherein the pouch comprises first and second extensions each extending from a side surface of the pouch along the particular direction not to contact the electrode assembly, and wherein the first and second ribs respectively comprise first and second grooves configured to receive the first and second extensions, respectively.

20. The battery pack of claim 19, wherein each of the extensions has a downward slope formed along the particular direction.

* * * * *